(12) United States Patent
Moon et al.

(10) Patent No.: US 9,707,735 B2
(45) Date of Patent: Jul. 18, 2017

(54) LAYERED SANDWICH STRUCTURE

(75) Inventors: Hyun Moon, Bloomfield Hills, MI (US); Semen Kharchenko, Ann Arbor, MI (US); Robert H. Beck, Sylvania, OH (US)

(73) Assignee: Masco Bath Corporation, Moorestown, NJ (US)

( * ) Notice: Subject to any disclaimer, the term of this patent is extended or adjusted under 35 U.S.C. 154(b) by 1818 days.

(21) Appl. No.: 12/661,948

(22) Filed: Mar. 26, 2010

(65) Prior Publication Data

US 2011/0236656 A1 Sep. 29, 2011

(51) Int. Cl.
| | |
|---|---|
| *G01N 3/40* | (2006.01) |
| *G06Q 99/00* | (2006.01) |
| *B32B 5/18* | (2006.01) |
| *B32B 5/02* | (2006.01) |
| *B32B 27/06* | (2006.01) |
| *B32B 27/28* | (2006.01) |
| *B32B 27/36* | (2006.01) |
| *B32B 27/38* | (2006.01) |
| *B32B 27/40* | (2006.01) |

(52) U.S. Cl.
CPC ............... *B32B 5/18* (2013.01); *B32B 5/022* (2013.01); *B32B 5/024* (2013.01); *B32B 27/065* (2013.01); *B32B 27/285* (2013.01); *B32B 27/36* (2013.01); *B32B 27/38* (2013.01); *B32B 27/40* (2013.01); *G06Q 99/00* (2013.01); *B32B 2250/03* (2013.01); *B32B 2250/40* (2013.01); *B32B 2262/101* (2013.01); *B32B 2266/0278* (2013.01); *B32B 2274/00* (2013.01); *B32B 2307/50* (2013.01); *B32B 2307/546* (2013.01); *B32B 2307/732* (2013.01); *B32B 2605/12* (2013.01); *B32B 2607/00* (2013.01); *Y10T 428/2495* (2015.01)

(58) Field of Classification Search
USPC ........ 428/306.6, 308.4, 316.6; 442/221, 223, 442/226, 315, 370, 372, 374; 73/78
See application file for complete search history.

(56) References Cited

U.S. PATENT DOCUMENTS

| | | | |
|---|---|---|---|
| 4,121,008 A | | 10/1978 | Seddon |
| 4,188,428 A | * | 2/1980 | Wolf ............................... 428/71 |
| 4,706,597 A | * | 11/1987 | Figone ........................... 114/353 |
| 5,327,358 A | | 7/1994 | Stubbs |
| 6,161,080 A | | 12/2000 | Aouni-Ateshian et al. |
| 6,286,681 B1 | | 9/2001 | Wilfong, Jr. et al. |
| 6,361,451 B1 | | 3/2002 | Masters et al. |

(Continued)

FOREIGN PATENT DOCUMENTS

CA 1285431 7/1991

*Primary Examiner* — Joanna Pleszczynska
(74) *Attorney, Agent, or Firm* — Emch, Schaub & Porcello Co., LPA

(57) ABSTRACT

This homogenized, multilayer sandwich structure has a total bending stiffness. The structure has two external skins each of a material having a modulus, a thickness and a width with contribution to the total moment of inertia. The structure also has a core of a foam material sandwiched between the two external skins, wherein the core has a modulus, a thickness and a width with contribution to the total moment of inertia. The external skins are fixed to the core, the strength of the structure being dependent on the core thickness via cubic power, as well as on the placement of the layers within the structure.

2 Claims, 3 Drawing Sheets

(56) References Cited

U.S. PATENT DOCUMENTS

| | | |
|---|---|---|
| 6,521,312 B1 | 2/2003 | Keiser |
| 6,845,671 B2 | 1/2005 | Hull |
| 2004/0028887 A1* | 2/2004 | Messinger ................ 428/304.4 |
| 2006/0144129 A1 | 7/2006 | Farritor et al. |
| 2009/0192610 A1 | 7/2009 | Case et al. |

\* cited by examiner

LAYERED SANDWICH STRUCTURE

FIELD OF THE INVENTION

This invention relates to a multilayer sandwich structure. In one embodiment, the invention relates to sandwich constructions comprising two external skins with a foam core sandwiched between the skins. The invention also relates to a Model for Calculation of Stiffness/Cost Values for the Structures.

BACKGROUND OF THE INVENTION

Cost effective structures having desirable stiffness are needed. Foam sandwich constructions and methods for generating them are known in the art. The construction includes a central foam layer which is formed of material selected so that central layer can be a substantially thick spacer contributing to the overall stiffness of the construction. The materials for the skins primarily are glass fiber reinforced plastic. The core materials generally are polyurethane foam. But it is possible to use other materials for both. Planar sandwich constructions such as straight beams or flat panels are included. The invention may also find use in relation to curved constructions, such as hulls of boats or tubs.

The invention can be applied to 2-, 3- (and more) layer sheet-like structures, such as films, walls and other types of 'physical barriers', ranging from flexible to rigid, whereby the unlimited range of the individual layer thicknesses, their moduli as well as the costs can be used as input parameters.

SUMMARY OF THE INVENTION

This invention offers an analytical model for calculation of multilayer sheet bending stiffness in relation to the total materials cost. The model can be applied to 2-, 3- (and more) layer sheet-like structures, such as films, walls, and other types of 'physical barriers', ranging from flexible to rigid, whereby the unlimited range of the individual layer thicknesses, their moduli as well as the costs can be used as input parameters. The result is either a value of the total bending stiffness of a multilayer structure or the ratio of the total bending stiffness to cost.

A preferred embodiment results in a homogenized, multilayer sandwich structure wherein the structure has a total bending stiffness. The structure has two external skins each of a material having a modulus, a thickness and a width with contribution to the total moment of inertia. The structure also has a core of a foam material sandwiched between the two external skins, wherein the core has a modulus, a thickness and a width with contribution to the total moment of inertia. The external skins are fixed to the core, the stiffness of the structure being greatly dependent on the composite thickness, via cubic power, as well as on the placement of the layers within the structure.

DETAILED DESCRIPTION OF THE INVENTION

This invention offers an analytical model for calculation of multilayer sheet bending stiffness in relation to the total materials cost. The model can be applied to 2- or 3- (and more) layer sheet-like structures, such as films, walls and other types of 'physical barriers', ranging from flexible to rigid, whereby the unlimited range of the individual layer thicknesses, their moduli as well as the costs can be used as input parameters. The result is either a value of the total bending stiffness of a multilayer structure or the ratio of the total bending stiffness to cost.

Figure 1:
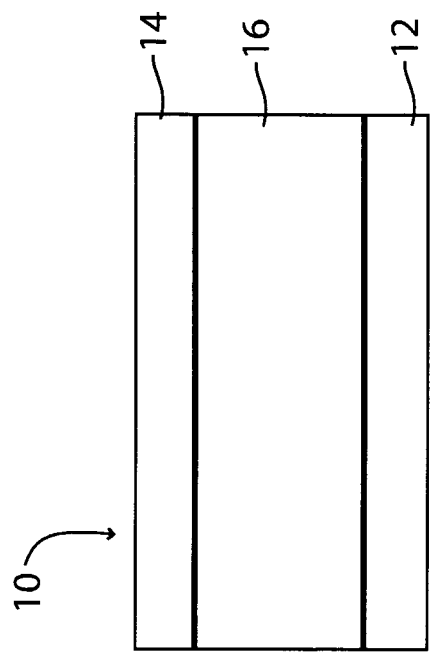
FIG. 1 is a side view of the foam sandwich structure of this invention.

FIG. 1 is a side view of the foam sandwich structure of this invention. FIG. 1 shows structure 10 including skin 12, skin 14 with foam layer 16 sandwiched therebetween.

Figure 2:
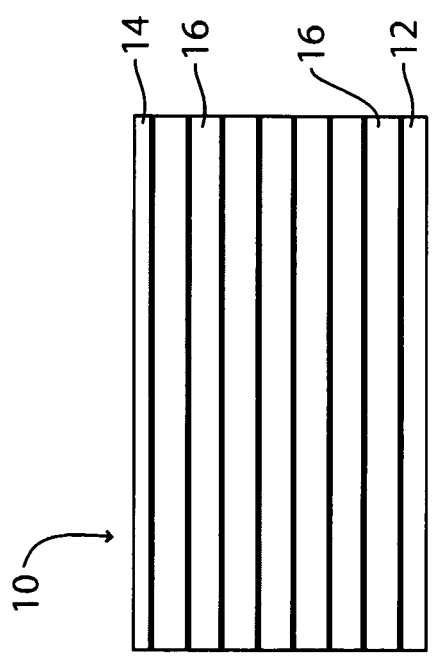
FIG. 2 is a side view of a multilayer sandwich structure of this invention.

FIG. 2 is a side view of multilayer sandwich structure of this invention. FIG. 2 illustrates an example of multilayer sheet structure 10 of n-layers.

For such a multilayer structure, the total bending stiffness ($S_T$) is a complex function of each layer's modulus ($E_i$) and its contribution to the moment of inertia ($I_i$), which is defined by the layer thickness and its location in the structure (as governed by $h_i$):

$$S_T = \sum_{i=1}^{n} S_i \qquad \text{Eq. (1)}$$

$$= \sum_{i=1}^{n} E_i \cdot I_i$$

$$= E_1 \sum_{i=1}^{n} \frac{E_i}{E_1} I_i = E_1 \sum_{i=1}^{n} n_i I_i$$

Where:

$$n_i = \frac{E_i}{E_1}$$

is the ratio of the modulus of the $i^{th}$ layer to the reference (i=1) layer

Where:

$$I_i = \frac{W n_i h_i^3}{12} + W n_i h_i (r_i - R)^2 \qquad \text{Eq. (2)}$$

Where:

$$R = \frac{\sum_{i=1}^{n} n_i h_i r_i}{\sum_{i=1}^{n} n_i h_i}$$

is a neutral axis of a composite layer
And:

$$r_i = \sum_{i=1}^{i-1} h_i + \frac{1}{2} h_i$$

is a distance from the reference layer to the mid-plane position of the $i^{th}$ layer And W is the composite width and $h_i$ is the thickness of the $i^{th}$ layer.

Under bending conditions, there will always be a neutral axis defining the compression-tension interface. For homogeneous materials (all constituents have the same, single modulus; left hand side image) the neutral axis would be positioned in the very middle of the structure, but for a non-homogeneous (multiple layers have different moduli, right hand side image, below) there will be a shift in the position of the neutral axis resulting from disparity in both the modulus as well as the placement of that layer.

In a homogeneous structure the top and bottom areas are equal. In a non-homogeneous structure, the top and bottom areas are not equal.

For a multilayer structure under bending conditions, the neutral axis location can be calculated based on the information about the layers' modulus, size and location. Cubic power is defined in the above equations.

Figure 3:
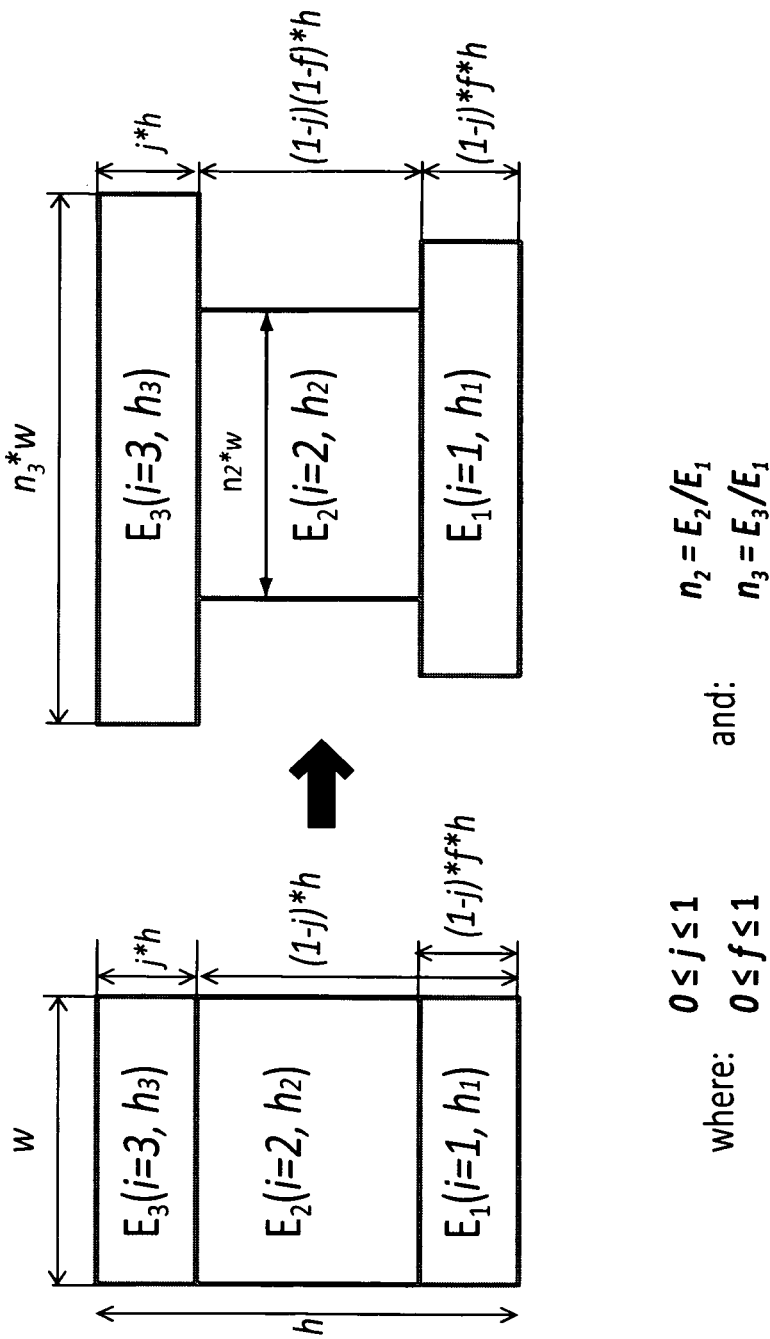
FIG. 3 is a schematic representation of homogenized approach for calculation of the bending stiffness of this invention for a 3-layer structure.

FIG. 3 shows the "homogenization" approach we employed to arrive at the model equation for stiffness calculation. FIG. 3 shows layers of different moduli referenced to (or represented by) one of the layers. The example depicts a bottom layer as a reference layer with modulus $E_1$. The result of the calculation of the bending stiffness would be identical should any other layer within the layered structure be chosen as a reference layer. The layer homogenization is achieved via changing the width of the $i^{th}$ layer by a multiplier $n_i$ calculated as a ratio of that layer's modulus to the modulus of the reference layer.

The left side of the equation shows a non-homogeneous multilayer structure wherein the layers have the same width. The right side of the equation shows a homogenized multilayer structure wherein the width of a layer is changed by a multiplier $n_i$ calculated as a ratio of that layer's modulus to the modulus of the reference layer.

The homogenization allows for direct application of equations (1) and (2), so that the total stiffness of the multilayer structure ($S_T$) is calculated.

The total cost of the multilayer structure is then calculated as a sum of products of the individual layer thicknesses with their respective costs:

$$\text{Cost} = h \cdot [j \cdot C_3 + (1-j)(1-f) \cdot C_2 + (1-j)f \cdot C_1] \qquad \text{Eq. (3)}$$

Where j and f are multipliers (from zero to unity) used to represent the fraction of the thickness of the individual layers in the multilayer structure.

Finally, the Stiffness to Cost ratio can be calculated directly as $S_T$/Cost.

The analytical model provides reliable means for prediction of the stiffness of multilayer structures in relation to the materials cost without the need to manufacture the representative prototypes. This is achieved by utilizing the "homogenization" approach whereby a layer of a given modulus and given width is represented through a modulus (and width) of a reference layer within the multilayer structure, having a new width calculated through a multiplier, a ratio of that layer's modulus to the modulus of the reference layer.

The method of forming the foam sandwich construction may vary widely. In particular the constructions are built up generally in a female mold.

The general basic principle for laying up is first to apply a "gel" coat to the polished surface of the mold. This then is followed with a lay-up of a first skin, for example of glass reinforced plastics, to a specified thickness. Foam material then is applied. Onto the foam is applied further glass cloth and resin. The foam material suitably is expanded polyurethane that may be elastomeric.

The glass cloth can be: (a) a chopped strand mat of glass fibers; (b) a woven roving of glass fibers; (c) a woven cloth of glass fibers; and combination thereof.

For example, in hull shapes of boats, the strips of foam material are applied to wet resin such as polyester, polyether, or epoxy resin and provided that the width of the strip of the foam material is limited, the foam material will remain in intimate contact with the resin and become securely bonded to it without voids, without use of external holding down arrangements. Alternatively, the skin may be allowed to set and the strips of foam may be bonded together using further resin.

In accordance with foam sandwich technology the introduction of a foam interlayer should result in a reduction of the required resin and glass content with a reduction in labor time for applying the latter and so one object might be seen as to endeavor to lay up the foam in a time not more than the time saved by reducing the glass/resin content.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A process for calculating the total bending stiffness ($S_T$) of a non-homogenous multilayer sandwich structure comprising the steps of:

providing non-homogenous a multilayer structure wherein each layer has a modulus ($E_1$), each layer has a moment of inertial ($I_i$), each layer has a thickness, each layer has a location in the structure, each layer has a width;

calculating a neutral axis location in the non-homogenous, multilayer structure;

depicting a layer $E_1$ as a reference layer;

achieving layer homogenization by changing the width of a layer by a multiplier $n_i$ calculated as a ratio of that layer's modulus to the modulus of the reference layer;

wherein the layer homogenization is represented by the formula:

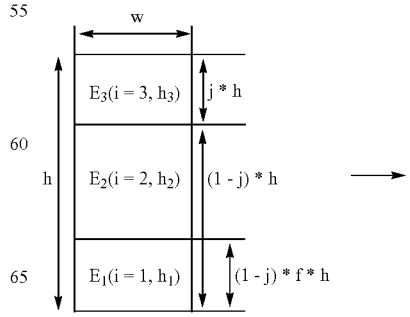

-continued

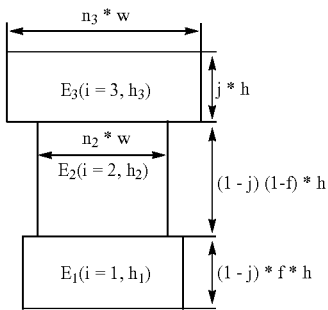

where: $0 \le j \le 1$ and: $n_2 = E_2/E_1$
$0 \le f \le 1$ $n_3 = E_3/E_1$ calculating the total stiffness of the multilayer structure ($S_T$), $$S_T = \sum_{i=1}^{n} S_i \quad \text{Eq. (1)}$$

$$= \sum_{i=1}^{n} E_i \cdot I_i$$

$$= E_1 \sum_{i=1}^{n} \frac{E_i}{E_1} I_i = E_1 \sum_{i=1}^{n} n_i I_i$$

Where:

$$n_i = \frac{E_i}{E_1}$$

is the ratio of the modulus of the $i^{th}$ layer to the reference (i=1) layer.

2. A process according to claim 1 wherein:

$$I_i = \frac{W n_i h_i^3}{12} + W n_i h_i (r_i - R)^2 \quad \text{Eq. (2)}$$

Where:

$$R = \frac{\sum_{i=1}^{n} n_i h_i r_i}{\sum_{i=1}^{n} n_i h_i}$$

is a neutral axis of a composite layer
And:

$$r_i = \sum_{i=1}^{i-1} h_i + \frac{1}{2} h_i$$

is a distance from the reference layer to the mid-plane position of the $i^{th}$ layer
And W is the composite width and $h_i$ is the thickness of the $i^{th}$ layer.

* * * * *